Patented Aug. 26, 1952

2,608,589

UNITED STATES PATENT OFFICE 2,608,589

METHOD OF REDUCTION OF ESTERS, ETHOLIDES, GLYCERIDES

Paul Anglaret, Ville D'Avray, France

No Drawing. Application June 27, 1947, Serial No. 757,661. In France July 5, 1946

5 Claims. (Cl. 260—638)

This invention relates to the reduction of esters, etholides, glycerides (glycerine esters), nitriles (alkyl cyanides) and the like. The method of the invention is particularly useful in the production of higher alcohols.

It has been common knowledge for a long time that the only way for the chemical reduction of esters for the production of the alcohol corresponding to the acid of the ester is by the use of sodium and an alcohol.

However, this process often allows only a poor recovery of the alcohol (60 to 80%).

Various patents, that claim to give good results, advocate working under vacuum, under hydrogen pressure, or by adding the ester alcohol mixture in theoretical amount to the sodium dissolved in a suitable solvent. These processes, however, are never satisfactory as far as quantities (yields) are concerned, and exhibit various drawbacks in their procedure (use of pressure, vacuum, exceptional dissolving agents). Moreover, the possible glycerine recovery and the continuous operation are difficult.

The improvement introduced by this invention has as its main feature the decomposition of the alcoholate formed in the reaction, by means of either one of two reagents which do not themselves react upon the sodium as such, under the conditions present in the reaction mass. But these reagents are capable, however, of regenerating the alcohol from the alcoholate, and act to precipitate the sodium in the form of a salt of high sodium content and which salt, however, does not add substantially to the viscosity of the solution. The amount of alcohol in question is thus recovered in a satisfactory quantity, the decomposition of the alcoholate eliminating all secondary reaction that might prove detrimental to this result.

According to the reagent and alcohol employed, an exact degree of temperature, strength of solution and a definite working procedure must be put into service in order, on the one hand, to reach without difficulty the output required and, on the other hand, to use only the minimum amount of sodium.

Moreover, when the operation is conducted in alcoholic solution, the use of any solvent, other than the alcohol, can be avoided. The sodium in small lumps can be added to the liquid ester-alcohol mixture. The treatment is carried out at normal atmospheric pressure.

The process can be adapted to the same materials as the standard method of Bouveault and Blanc.

The decomposition of the alcoholate under the conditions indicated, which constitutes the main object of this invention, can be effected in various ways and by various substances.

As a guide and not in any way binding, mention may be made especially of salts with acid reaction, e. g. $NH_4Cl$, acid anhydrides, e. g. $CO_2$, organic substances that can give various condensations with the alcoholates, for instance, chlorinated compounds in which the chlorine is especially unstable, substances that are able to convert the alcoholate merely by additive reaction. The ammonium salts which react upon the alcoholate can give a reaction expressed as follows, in case X is a monovalent acid radical:

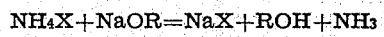
$$NH_4X+NaOR=NaX+ROH+NH_3$$

(R is the hydrocarbon radical of the alcohol which with sodium forms sodium alcoholate, e. g. —$C_4H_9$). The acid radical can be —Cl, in the case of ammonium chloride.

The salts formed do not have more than a very slight solubility in the alcohols.

The $CO_2$ reacts with the alcoholate, thus:

$$CO_2+NaOR \rightarrow NaRCO_3$$

and the addition of water causes the following reaction:

$$2NaRCO_3+H_2O \rightarrow CO_3Na_2+CO_2+2ROH$$

The salts formed do not have more than a very slight solubility in the lower alcohols; thus, $CO_3Na_2$ is practically insoluble in butyl alcohol.

Generally speaking, it will be possible to use for this procedure all substances able to ensure, by a particular reaction, the decomposition of the alcoholate, that, if present, is positively harmful for a satisfactory recovery in any amount as a result of the reaction. These bodies, however, under the conditions in which they are applied, must not give any secondary reactions with the substances usually present or produced during the reaction (ester, alcohol, sodium, nascent hydrogen) and the conversion of the alcoholate must proceed at a satisfactory rate.

Other advantages of the process are presented by the possibility that the process can be made continuous, the complete recovery of the glycerine, the complete security and speed of the process.

The following examples of performance of this invention may be submitted as a guide without any restricting clauses.

*Example I.—Chemical agent for the decomposition of the alcoholate: Ammonium chloride ($NH_4Cl$).*

Into a balloon-flask furnished with a downwardly extending condenser and with a mechanical agitator, is placed 100 gr. of whale oil (saponification value: S. V.=135, iodine value, I. V.=75) and 200 to 300 gr. of anhydrous butanol (butyl alcohol). The temperature is kept at 100–115° C., so that the emission of ammonia ($NH_3$) gradually draws off the greater portion of the butyl alcohol. Then 27.5 gr. of sodium (125% of the theoretical amount) cut up into pieces, each weighing less than 1 gr., is added little by little during agitation. 71 gr. of ammonium chloride is then added in fractional parts.

The sodium reacts on the butyl alcohol, forming sodium butylate, i. e.

$$C_4H_9OH + Na = C_4H_9ONa + H$$

When the ammonium chloride reacts with the sodium butylate, sodium chloride is formed, which being insoluble in butyl alcohol, precipitates $C_4H_9ONa + NH_4Cl = NaCl + C_4H_9OH$. The ammonia gas liberated mostly escapes through the condenser, and can be recovered, e. g., by absorption in HCl.Aq, to reform ammonium chloride.

When the reaction is ended, the remaining butyl alcohol is distilled, then the heavy alcohols obtained by the reaction on the whale oil are washed with hot water. The hot water dissolves the sodium chloride and the glycerine liberated from the whale oil, in the process. The recovery of glycerine from the saline solution is an easy matter.

The resulting product, higher alcohol produced by the reduction of the fatty acids of the whale oil and also higher alcohol produced by saponification of the whale oil (which is partly glyceride esters of higher fatty acids, and partly esters of higher monohydric alcohols with such fatty acids) consists of 90 gr. that, after treatment with a few drops of hydrochloric acid, washing and drying, has acidity value: A.V.=1.5, S.V.=3.5, I.V.=67, hydroxyl value: H.V.=224. The overall reaction can be expressed in a simple condensed form, as follows:

$$RCOOR' + 4Na + 4NH_4Cl \rightarrow RCH_2OH + R'OH + 4NaCl + 4NH_3$$

in which —COOR' is the fatty acid (or acids) of the whale oil (which is a mixture of esters), and R is the alkyl residue of such esters (whether monohydric or trihydric).

*Example II.—Chemical reagent used for decomposition of alcoholate and precipitation of the sodium as a salt: Carbon dioxide ($CO_2$ with $H_2O$).*

In a balloon-flask of 1.5 litres capacity and of suitable shape, is added 200 gr. of butyl oleate and 400 to 600 gr. of butanol (butyl alcohol). Carbon dioxide is beaten into the solution by means of a perforated hollow agitator; 66 gr. of sodium (an excess of 25%) cut up into pieces of less than 2 gr. each is added gradually. The temperature, starting at 80° C., rises steadily so as to reach the boiling point of the mixture at the end of the reaction. Water is added by degrees in some suitable shape (for instance, hydrated mineral salts) so that the mixture preserves a slight degree of viscosity. It will be understood that the hydrated mineral salts will be such as do not react unfavorably with any of the substances in the mixture. Crystallized sodium carbonate decahydrate would be entirely suitable.

The butanol (butyl alcohol) is for the most part carried off by the current of $CO_2$.

After the last piece of sodium is added, the remaining butanol is distilled. Enough hot water is added to dissolve the sodium carbonate formed.

The layer of oleic alcohol that separates out is treated with a few drops of hydrochloric acid, then washed until it is quite neutral, and dried.

The resultant product consists of 155 gr. exhibiting the following characteristics: S.V.=3, A.V.=0.8, I.V.=80, hydroxyl value: H.V.=199.

On treating rape-seed oil in the same manner (S.V.=177, I.V.=105, A.V.=0.4) there is produced a product showing values: S.V.=3, A.V.=0.5, I.V.=105, hydroxyl value=187, but in this case it is necessary to add 40% excess of sodium, because the glycerine formed reacts on the sodium with partial loss of the latter. The recovery of the glycerine presents no difficulty.

These processes are capable of being placed on a continuous basis. For instance, by working with ammonium chloride added, the establishment as a continuous procedure of Example No. 1 may be conducted in the following way:

The operation takes place in a horizontal tube, with the agitator formed by a second tube revolving at high speed inside the first tube. Several (n) tubes in series are needed. 1/n of the required amount of sodium is added, at the front end of each tube, in pieces of which the diameter is slightly less than the difference of the radii of tube and agitator. The ester-butanol mixture with its content of all the ammonium chloride is added at the front end of the first tube.

Between the outlet end of a tube and inlet end of the following tube, a portion of the butanol is distilled, so that at the end of the procedure the greater portion of the butanol has been removed. The amounts of reagents used are nearly the same as in the non-continuous experimental run (i. e. in Example I).

The temperature of the first tube is 80° C., the other tubes have successively higher temperatures, with temperatures in the last tube at 110° C.

The number of tubes is a factor of the weight of sodium pieces that the size of the apparatus allows to be added. The greater the size of the apparatus, the smaller the number of tubes required.

On exit from the last tube, the normal work of distilling is carried out, with washing, and decanting by continuous standard methods.

It may be observed that the starting mixture may be obtained directly by bringing in the ammonia gases and hydrochloric acid gas into the ester-butanol mixture, so that hydrochloric acid and sodium are the only reagents used up.

The results obtained are as good as in the non-continuous process.

It will thus be seen that the invention relates to improvements in the reduction of esters, etholides, glycerides, nitriles, etc., by means of an alkali metal, such as sodium, and an alcohol; characterized by the fact that alkali metal alcoholate produced by a side reaction is decomposed. By decomposing the alcoholate objectionable secondary reactions are prevented. Due to the decomposition of the alcoholate it is rendered harmless in the working of the process.

The following additional examples may be considered. They deal especially with improvements in recoveries, lowering of the amounts of lower alcohol, such as butyl alcohol, used and the reduction of nitriles (alkyl cyanides).

*Example III.—Reduction of stearic nitrile*

Ammonium chloride in excess is added to the stearic nitrile dissolved in butyl alcohol. With the temperature kept at about 80° C. the theoretical amount of sodium is added gradually, to give then a mixed product, of 70% of secondary amines or amino-bases, and 20% of primary amines or imino-bases.

*Example IV.—(a) Reduction of pure butyl oleate*

Into a balloon-flask furnished with a condenser, is placed 100 grams of butanol (butyl alcohol) and a fractional proportion ($\frac{1}{10}$ to $\frac{1}{4}$) of the total amount (150 gr. for the particular example) of the butyl oleate to be reduced; about 55 gr. of sodium is added very slowly so that the total addition spreads over a period of several hours; for this reason, the reliability of the procedure is substantially increased in relation to other known methods.

After 1.5 gr. of sodium has been introduced, a continuous flow of water is directed into the mixture through the upper end of the condenser, so that the amount of water which has been added up to any instant during the reaction is slightly less than the theoretical amount required based on the amount of sodium which has been added up to that instant. The addition of water is continued until substantially the theoretical quantity (21 gr.) has been added. The overall reaction can be expressed as follows:

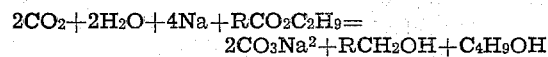

$$2CO_2 + 2H_2O + 4Na + RCO_2C_4H_9 = 2CO_3Na_2 + RCH_2OH + C_4H_9OH$$

($RCO_2C_4H_9$ denotes butyl oleate)

During this operation carbon dioxide and water are added in the respective required amount.

In the same way, the remainder of the oleate is added gradually. The temperature, starting at about 80° C., is raised slowly so as to reach at the end of the proceedings the boiling point of the medium.

When the reaction is completed, the required amount of hot water is added for dissolving the sodium carbonate formed; this can be done without any risk as the sodium has been completely converted; then the organic layer is decanted off and the butanol is separated out by distillation; thus the recovery is about 99.5%.

By means of a further distillation, about 112 to 113 gr. of pure oleic alcohol is obtained, thus giving a final recovery in the region of 98%.

(b) This working technique can be applied to glycerides (glycerine esters). For instance, with palm kernel oil, if the product of reaction, after removal of sodium carbonate and butanol, is treated with a little hydrochloric acid, then washed until neutral to litmus paper, the result obtained, in theoretical amount, is a crude product exhibiting the following values:

Acidity value=1
Saponification value=7
Iodine value=22
Hydroxyl value=268

This last technique has the advantage over the previous examples by bringing into play only slight amounts of butanol, while allowing recovery of the glycerine to proceed.

The invention offers a number of advantages: When starting with chemically pure products, it is possible to obtain a recovery of about 99.5% of the crude end product. If desired, a recovery in the neighborhood of 98% of pure fatty alcohol (e. g., oleic alcohol) may be obtained by distillation. The amount of lower alcohol, such as butyl alcohol, employed may be reduced, the amount not being in excess of the amount of the fatty substance treated and subject in particular cases to a very extensive decrease with no other solvent required. The reduction of nitriles, such as alkyl cyanides, may be effected in order to get secondary amines, or amino bases.

I claim:

1. In a method for the production of higher alcohol by the reaction of an ester of a higher fatty acid with metallic sodium and a lower aliphatic alcohol with resultant formation of a sodium alcoholate, the improvement which comprises: carrying out said reaction at substantially atmospheric pressure; during said reaction, decomposing the sodium alcoholate substantially as fast as it is formed and regenerating said aliphatic alcohol by adding during said reaction ammonium chloride; and maintaining during said reaction a temperature between about 80° C. and the boiling temperature of the mixture of reactants and reaction product.

2. In a method for the production of higher alcohol by the reaction of an ester of a higher fatty acid with metallic sodium and a lower aliphatic alcohol with resultant formation of a sodium alcoholate, the improvement which comprises: carrying out said reaction at substantially atmospheric pressure; during said reaction, decomposing the sodium alcoholate substantially as fast as it is formed and regenerating said aliphatic alcohol by adding during said reaction ammonium chloride; and maintaining during said reaction a temperature between about 80° C. and the boiling temperature of the mixture of reactants and reaction product, whereby the sodium salt produced by said reaction is substantially non-colloidal, is substantially insoluble in said lower aliphatic alcohol, has a high sodium content and does not materially increase the viscosity of the mixture of products of said reaction.

3. In a method for the production of higher alcohol by the reaction of an ester of a higher fatty acid with metallic sodium and a lower aliphatic alcohol with resultant formation of a sodium alcoholate, the improvement which comprises: carrying out said reaction at substantially atmospheric pressure; during said reaction, decomposing the sodium alcoholate substantially as fast as it is formed and regenerating said aliphatic alcohol by adding during said reaction ammonium chloride; and maintaining during said reaction a temperature between about 80° C. and the boiling temperature of the mixture of reactants and reaction product, thereby forming a non-viscous reaction product comprising said higher alcohol, unreacted portions of said lower aliphatic alcohol, and a non-colloidal sodium salt having a high sodium content, and insoluble in said lower aliphatic alcohol.

4. A method according to claim 3 further comprising separating said sodium salt and unreacted lower alcohol from said reaction product, and forming by said separation a residue containing said higher alcohol.

5. A method according to claim 4, further comprising recovering a substantially pure higher alcohol from said residue.

PAUL ANGLARET.

REFERENCES CITED

The following references are of record in the file of this patent:

UNITED STATES PATENTS

| Number | Name | Date |
| --- | --- | --- |
| 1,971,742 | Bertsch | Aug. 28, 1934 |

OTHER REFERENCES

"Organic Synthesis," Collective Vol. II, Reid et al., John Wiley and Sons, N. Y., pages 468–470 (1943).

Anglaret et al., Compte Rendu, vol. 223, pages 205–206 (1946).